United States Patent
Hutchison et al.

(10) Patent No.: US 6,921,109 B2
(45) Date of Patent: Jul. 26, 2005

(54) DEVICE PROVIDING VARIABLE STEERING RESPONSIVENESS

(75) Inventors: Wayne Robert Hutchison, Mayville, WI (US); David Lewis Marchese, Gaithersburg, MD (US)

(73) Assignee: Deere & Company, Moline, IL (US)

( * ) Notice: Subject to any disclaimer, the term of this patent is extended or adjusted under 35 U.S.C. 154(b) by 138 days.

(21) Appl. No.: 10/230,724

(22) Filed: Aug. 29, 2002

(65) Prior Publication Data

US 2004/0041386 A1 Mar. 4, 2004

(51) Int. Cl.⁷ .................................................. B62D 1/00
(52) U.S. Cl. ................. 280/771; 180/6.48; 280/93.502; 280/93.51; 280/98
(58) Field of Search ........................... 280/771, 93.502, 280/93.51, 93.513, 98, 211, 93.514, 913, FOR 107; 180/6.2, 6.48

(56) References Cited

U.S. PATENT DOCUMENTS

| 4,202,276 A | 5/1980 | Browne et al. |
| 4,212,483 A | 7/1980 | Howard |
| 4,700,794 A | 10/1987 | Bernhagen et al. |
| 5,719,459 A | 2/1998 | Hasegawa |
| 6,000,491 A | 12/1999 | Shimizu et al. |
| 6,129,164 A | 10/2000 | Teal et al. |
| 6,155,377 A | 12/2000 | Tokunaga et al. |
| 6,196,342 B1 | 3/2001 | Teal et al. |
| 6,257,357 B1 | 7/2001 | Teal et al. |
| 6,325,396 B1 | 12/2001 | Romig |
| 2003/0050145 A1 | 3/2003 | Hasegawa et al. |

FOREIGN PATENT DOCUMENTS

| JP | 08-310426 | 11/1996 |
| WO | WO 02/36410 | 5/2002 |

*Primary Examiner*—Eric Culbreth
(74) *Attorney, Agent, or Firm*—Bell, Boyd & Lloyd, LLC

(57) ABSTRACT

The present invention relates to a steering linkage device which transmits a user's input motion to at least one wheel of a vehicle, wherein the steering linkage device produces an output motion of a particular magnitude. The ratio of the magnitude of the input motion to the magnitude of the output motion varies, depending upon the magnitude of the input motion. The steering linkage device enhances the steering control of vehicle users by varying the steering responsiveness for different steering motions made by the users.

34 Claims, 14 Drawing Sheets

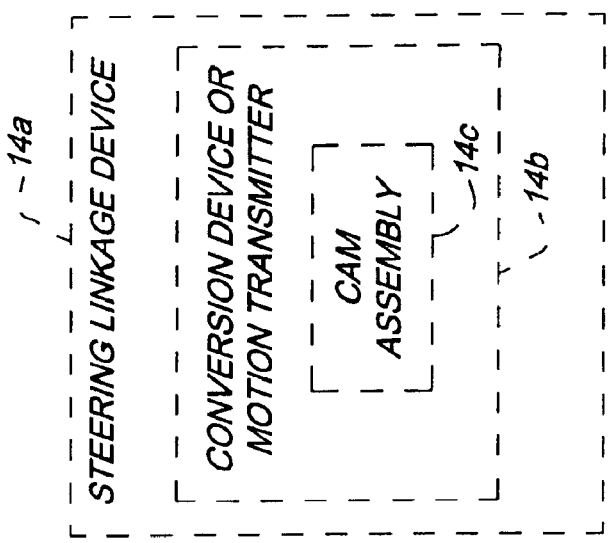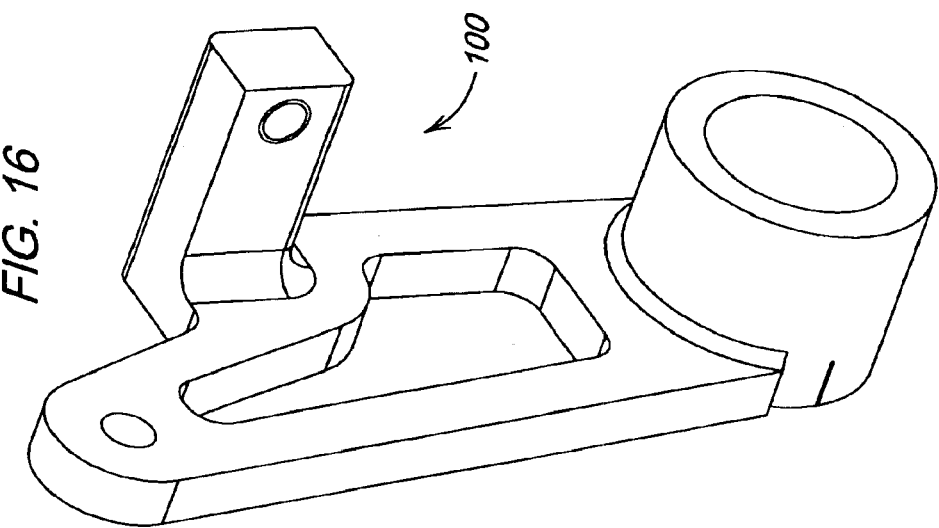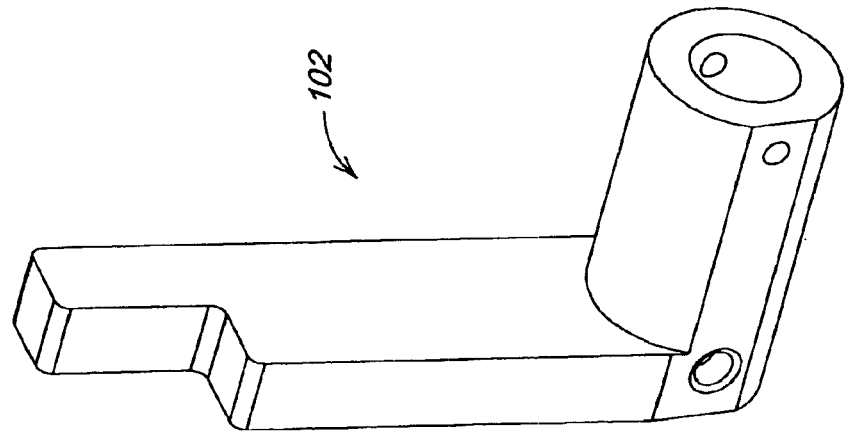

DEVICE PROVIDING VARIABLE STEERING RESPONSIVENESS

BACKGROUND OF THE INVENTION

The present invention generally relates to a device providing variable steering responsiveness. More specifically, the present invention relates to a device providing variable steering responsiveness which enhances the steering performance of vehicles, such as tractors.

When an operator of a vehicle, such as a tractor, makes a turn, the vehicle responds by changing the direction of the vehicle. In the conventional tractor, the steering wheel is coupled to a steering linkage which, in turn, is coupled to the front free-rotating wheels. When an operator turns the steering wheel, the front wheels pivot clockwise or counterclockwise. In one type of tractor, commonly known as a zero turn radius tractor, the rear drive wheels rotate independent of one another. The user controls both the speed and direction of this tractor by controlling the motion of the drive wheels relative to one another. In this case, the steering linkage is coupled to the drive wheels. When a user turns the steering wheel, this causes the drive wheels to rotate at different rates, which causes the tractor to turn.

Regardless of the type of tractor, the steering linkage typically includes a gear set having a fixed gear ratio. This fixed gear ratio determines the degree to which the steering linkage moves based on how far the user rotates the steering wheel. For example, for every half turn the user makes, the steering linkage may move four inches, causing the tractor to turn accordingly. Therefore, the tractor has a fixed steering responsiveness or sensitivity.

Depending on the user's level of skill, certain tractors, such as the zero radius turn tractor, can be challenging to steer, especially at relatively low speeds. To assist users, the gear reduction ratio can be increased so that the user's rotation of the wheel has less of an effect on the change in direction. For example, the gear set can be changed so that every half turn causes the steering linkage to move only two inches instead of four inches. Although the steering may no longer be too sensitive for the user, the user will now have to rotate the steering wheel a relatively high number of times in order to make certain turns. The effort required to steer the tractor can be burdensome, inconvenient and tiresome. Furthermore, having a fixed, relatively low steering responsiveness can make it difficult for users to avoid certain driving hazards in certain driving circumstances.

Therefore, there is a need to overcome these disadvantages.

SUMMARY OF THE INVENTION

The present invention relates to a device providing variable steering responsiveness which enhances the steering performance of vehicles, such as tractors. In one embodiment, the steering linkage device of the present invention is included in a vehicle which changes direction based on the difference in speed between the vehicle's right drive wheel and left drive wheel. Here, the vehicle includes a steering linkage or steering system which includes a steering device, such as a steering wheel, coupled to a gear assembly coupled to one or more steering arms. The steering arms are coupled to the steering linkage device which, it turn, is coupled to the vehicle's steering transmission. The steering transmission is coupled to the vehicle's drive transmission which controls the rotational speed of the drive wheels relative to one another.

In one embodiment, the steering linkage device includes a cam assembly which provides the variable steering responsiveness. In operation of one example, the user makes a half turn of the steering wheel, producing a steering input motion. The gear assembly converts this steering input motion to an arm input motion based on a fixed gear ratio determined by the diameters of the gears in the gear assembly. The steering arms transmit the arm input motion to the cam assembly. The cam assembly produces an output motion based on the arm input motion. Due to the cam profile, the steering ratio of the arm input motion to the output motion will vary within a range depending upon the magnitude of the user's input motion. The particular range of variation depends upon the particular profile or shape of the cam. Preferably, the cam profile is such that, for relatively slight turns, the steering ratio is relatively small, and for relatively large turns, the steering ratio is relatively large. Such a range of ratios decreases the likelihood that users will experience difficulty in steering control when traveling at relatively low speed. Also, such a range of ratios assists users when they have to make relatively large turns by decreasing the amount of input motion at the steering wheel.

The steering linkage device of the present invention, when coupled to a steering system of a vehicle, provides users with variable steering responsiveness. The steering linkage device, in one embodiment, includes a cam-follower assembly which produces a range of steering ratios depending upon the amount of steering motion made by the user. The steering linkage device of the present invention facilitates steering control and convenience in the operation of vehicles.

It is therefore an advantage of the present invention to provide a device providing variable steering responsiveness.

Another advantage of the present invention is to provide a mechanism which enables a steering system to have a range of steering input-output ratios, wherein the ratios automatically vary with different magnitudes of steering motions made by users.

Yet another advantage of the present invention is to facilitate a user's control in steering vehicles.

Still another advantage of the present invention is to increase a user's convenience when steering vehicles.

Additional features and advantages of the present invention are described in, and will be apparent from, the following Detailed Description of the Invention and the figures.

BRIEF DESCRIPTION OF THE FIGURES

FIG. 15 is an elevated side perspective view of the steering control shaft arm of the steering linkage device in one embodiment of the present invention.

FIG. 16 is an elevated side perspective view of the follower arm of the steering linkage device in one embodiment of the present invention.

FIG. 17 is a schematic representation of the steering linkage device, conversion device and cam assembly.

DETAILED DESCRIPTION OF THE INVENTION

Figure 1:
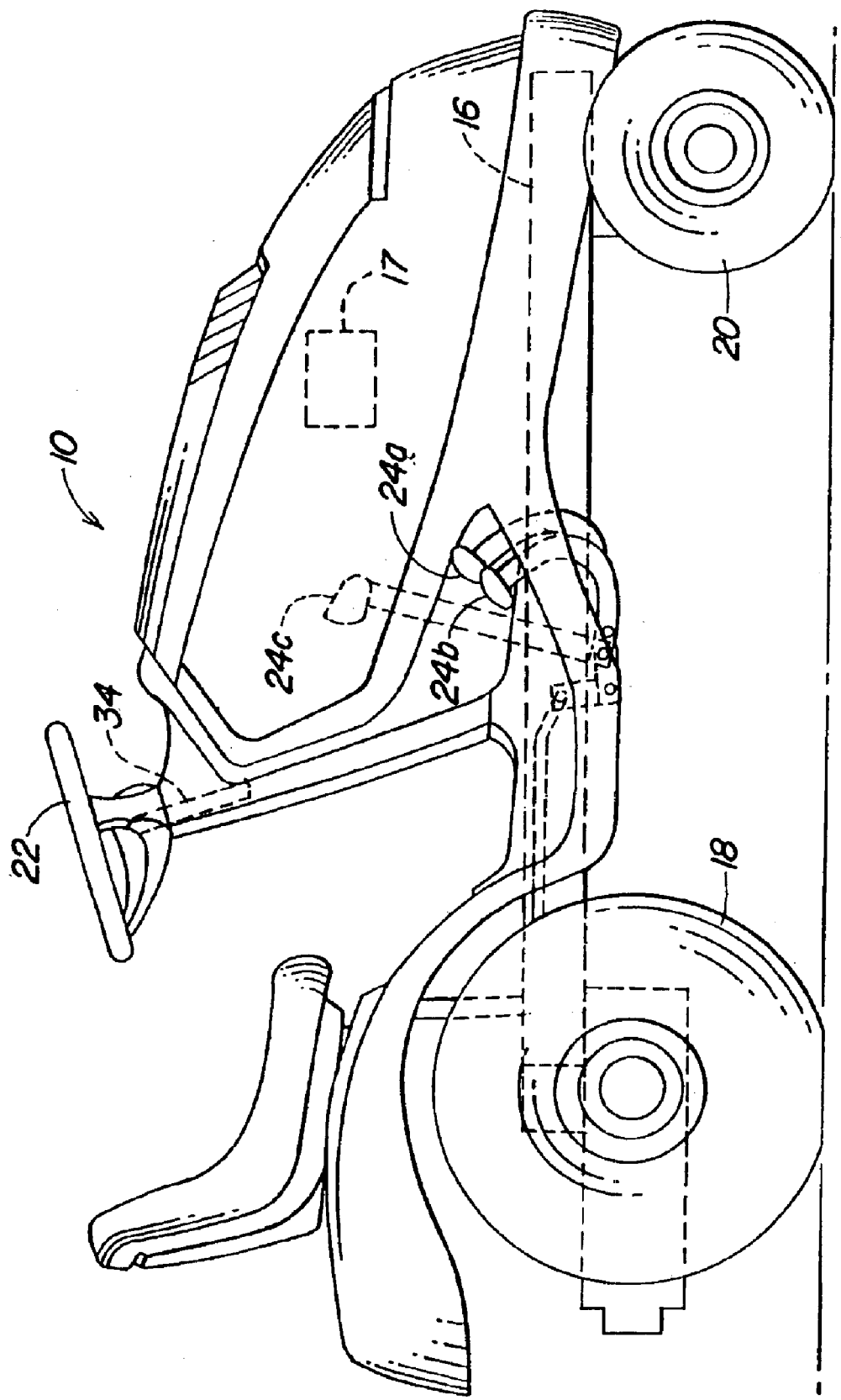
FIG. 1 is an elevated side perspective view of a tractor which includes the steering linkage device in one embodiment of the present invention.
Figure 2:
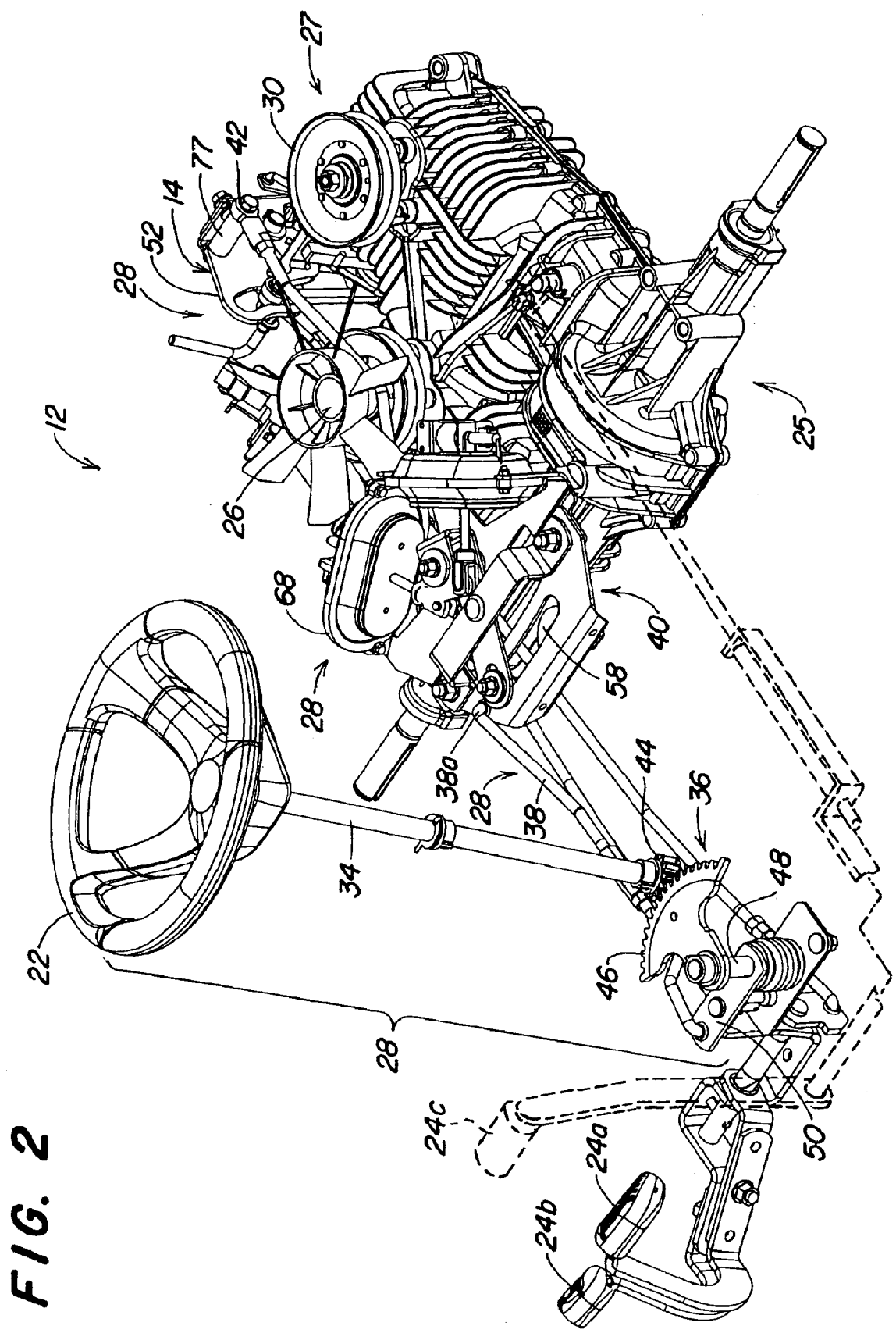
FIG. 2 is a top perspective view of the transmission assembly of a tractor which includes the steering linkage device in one embodiment of the present invention.
Figure 3:
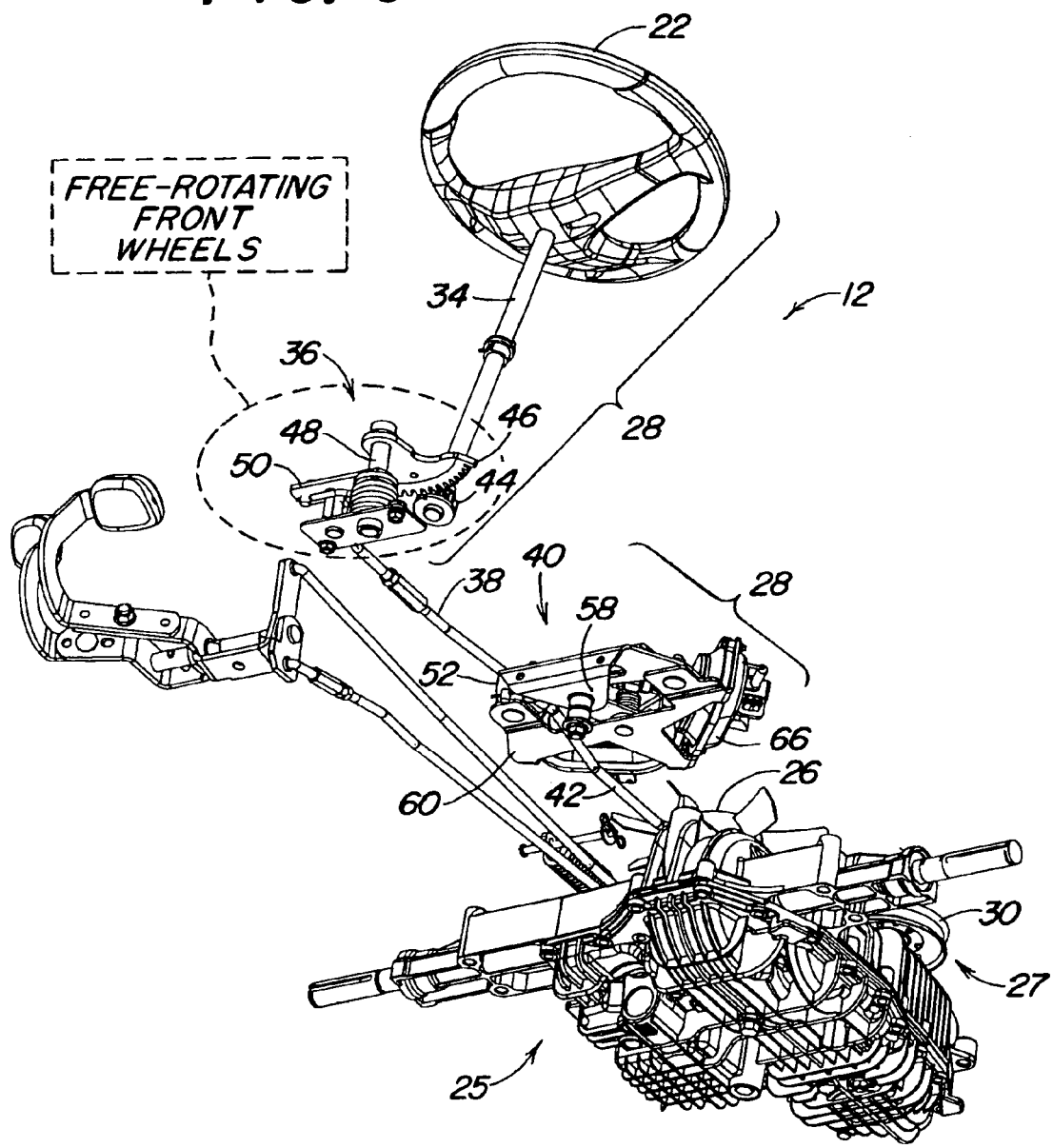
FIG. 3 is a bottom perspective view of the transmission assembly of a tractor which includes the steering linkage device in one embodiment of the present invention.
Figure 4:
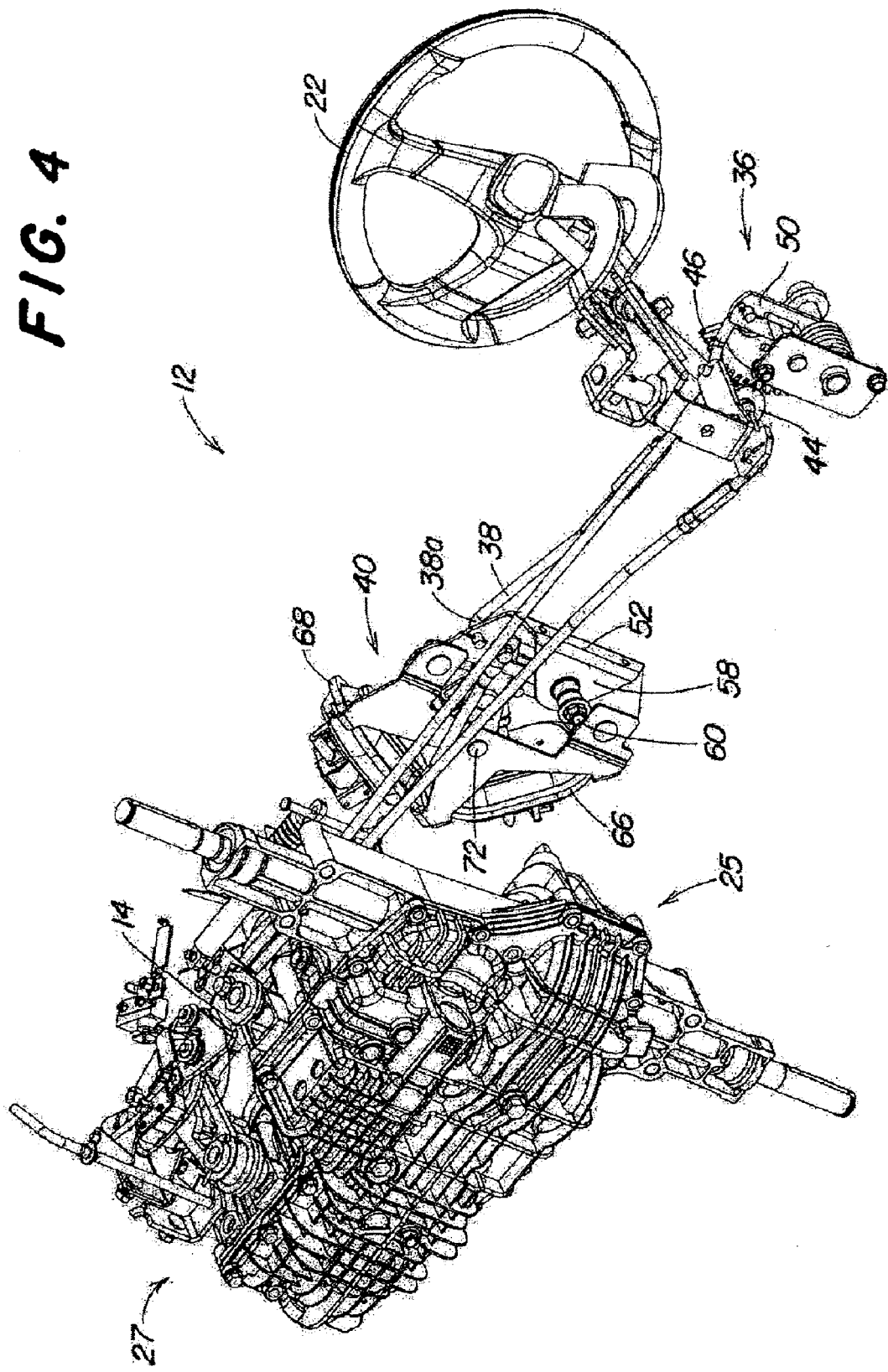
FIG. 4 is a bottom front perspective view of the transmission assembly of a tractor which includes the steering linkage device in one embodiment of the present invention.
Figure 5:
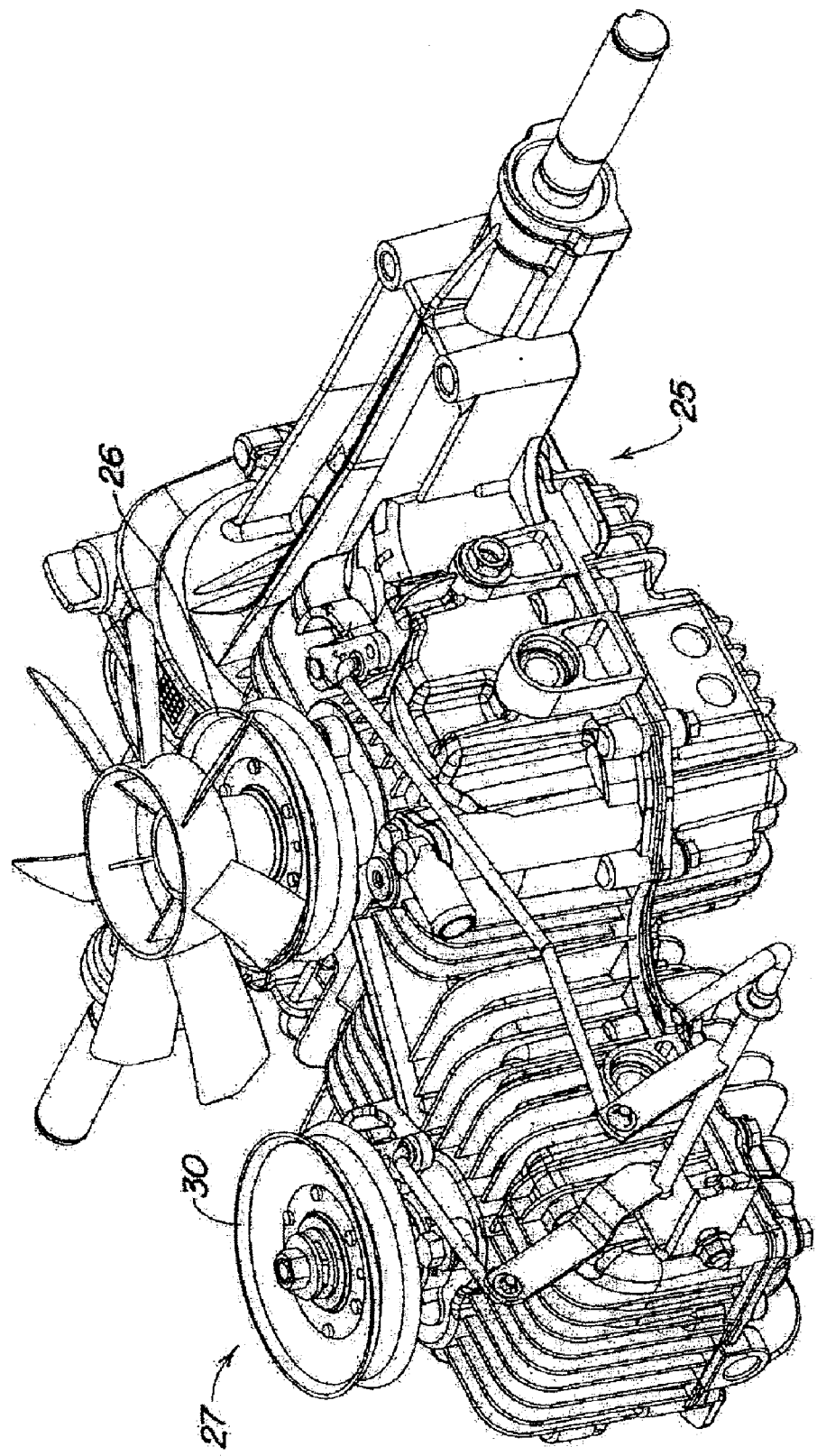
FIG. 5 is a top rear perspective view of the drive transmission and the steering transmission of a tractor which includes the steering linkage device in one embodiment of the present invention.

Referring now to the drawings, FIGS. 1 through 16 illustrate a tractor 10, including a transmission assembly 12 which includes the steering linkage device 14 in one embodiment of the present invention. The tractor 10, in one embodiment, includes: (a) a tractor frame 16; (b) a plurality of drive wheels 18 rotatably connected to the vehicle frame 16; (c) an engine 17 operatively coupled to the drive wheels 18 through the transmission assembly 12; (d) a plurality of swivel or caster wheels 20 rotatably connected to the tractor frame 16; (e) one or more control levers, a steering wheel or another suitable hand-controlled steering device 22 coupled to the transmission assembly 12 for controlling the direction of the tractor 10; and (f) a plurality of foot petals 24a to 24c operatively coupled to the transmission assembly 12 for controlling the motion of the tractor 10.

The transmission assembly 12 of tractor 10 includes: (a) a suitable drive transmission 25 which transmits motion from the engine to the driving pulley 26 to the drive wheels 18; and (b) a suitable steering transmission 27 which transmits motion from the steering device 22 to the drive transmission 25 for controlling the direction of the tractor 10. In one embodiment, the transmission assembly 12 of tractor 10 includes the mechanisms and components disclosed in U.S. Pat. No. 6,196,342 issued on Mar. 6, 2001 assigned to the assignee of the present invention, which is hereby incorporated by reference in its entirety. The foot pedals 24a to 24c include a forward foot pedal 24a for propelling the tractor 10 forward, a reverse foot pedal 24b for propelling the tractor 10 in a reverse direction and a brake pedal 24c for stopping tractor 10. The foot pedals 24a to 24c are operatively coupled to the drive wheels 18 through the drive transmission 25.

In the illustrated embodiment, the tractor 10 changes direction based on differences in the rotational speed of the drive wheels 18 relative to one another. Accordingly, the steering device 22 is operatively coupled to the drive wheels 18, preferably through the steering linkage 28 described below. Consequently, when a user pushes, pulls, turns or rotates the steering device 22, the user causes the right and left drive wheels 18 to rotate at different speeds relative to each other. This difference in rotational movement causes the tractor 10 to change its direction to the right or to the left relative to a straight or forward line of travel.

In one embodiment, the steering transmission 27 includes: (a) a steering pulley 30 which transmits motion from the engine to the steering transmission pistons (not shown) which are operatively coupled to the drive wheels 18; and (b) a steering linkage 28 which couples the steering device 22 to the steering control shaft 32 (shown in FIG. 12), which itself is coupled to the steering transmission pistons for controlling the rotation of the drive wheels 18 relative to each other. The steering linkage 28 includes: (a) a steering shaft 34 coupled to the steering device 22; (b) a steering gear set or assembly 36 coupled to the steering shaft 34; (c) an elongated front steering arm 38 coupled to the steering gear assembly 36; (d) a reverse steering logic mechanism 40 coupled to the front steering arm 38; (e) an elongated rear steering arm 42 coupled to the reverse steering logic mechanism 40; and (f) the steering linkage device 14 coupled to both the rear steering arm 42 and the steering control shaft 32.

The steering gear assembly 36 preferably includes: (a) a steering pinion gear 44 which mates with a steering sector gear 46; (b) a steering sector shaft 48 connected to the steering sector gear 46; and (c) a steering sector arm 50 connected to the steering sector shaft 48. When the user moves the steering device 22 (for example, clockwise or counterclockwise), the steering pinion gear 44 engages the steering sector gear 46, causing the steering sector shaft 48 to rotate. When the steering sector shaft 48 rotates, the steering sector arm 50 pivots, which causes the front steering arm 38 to move forward or backward relative to the tractor frame 16, depending upon the direction the user rotates the steering device 22. The particular diameter of the steering pinion gear 44 relative to the steering sector gear 46 determines a fixed gear ratio. This fixed gear ratio determines how many times (or to what extent) the user will have to turn the steering device 22 in order to obtain the desired change in direction of the tractor 10.

As best illustrated in FIGS. 3, 4 and 6 through 9, the reverse steering logic mechanism 40 includes a cam member 52 which includes: (a) a slot wall 54 defining a slot 56; and (b) an engaging member 58 which pivotally engages the cam member 52 to the tractor frame 16. Preferably, a pivot shaft 60 rotatably connects the engaging member 58 to the tractor frame 16 so that the cam member 52 can pivot about an axis defined by the pivot shaft 60. In addition, the cam member 52 includes one or more suitable actuating mechanisms 62 which actuate a shifting member 64. It is preferable that the actuating mechanism 62 includes a reverse shifting solenoid 66 and a forward shifting solenoid 68. The reverse shifting solenoid 66 and the forward shifting solenoid 68 include rods 70a and 70b, respectively. Rods 70a and 70b can be extended or retracted, depending upon the operation of the reverse shifting solenoid 66 and the forward shifting solenoid 68. The rear end 64a of shifting member 64 is pivotally connected to the cam member 52 by a pivot shaft or other suitable fastener 72. The front end 64b of the shifting member 64 includes a wall which defines an opening for receiving a bolt or pivot shaft 64c. Pivot shaft 64c rotatably connects the front end 42a of the elongated rear steering arm 42 to the front end 64b of the shifting member 64.

Figure 6:
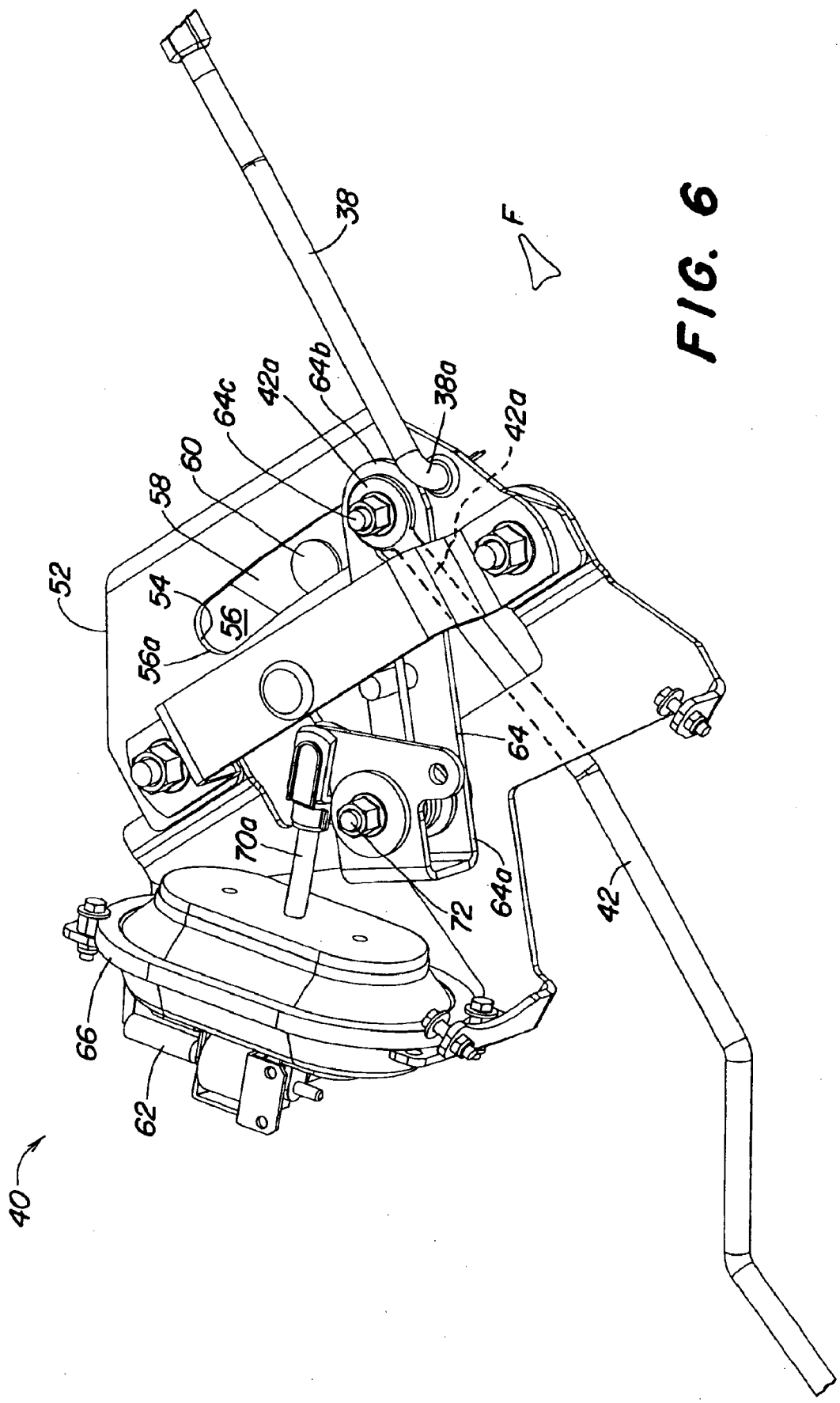
FIG. 6 is a top perspective view of the steering arms and reverse logic steering mechanism coupled to the steering linkage device in one embodiment of the present invention.
Figure 7:
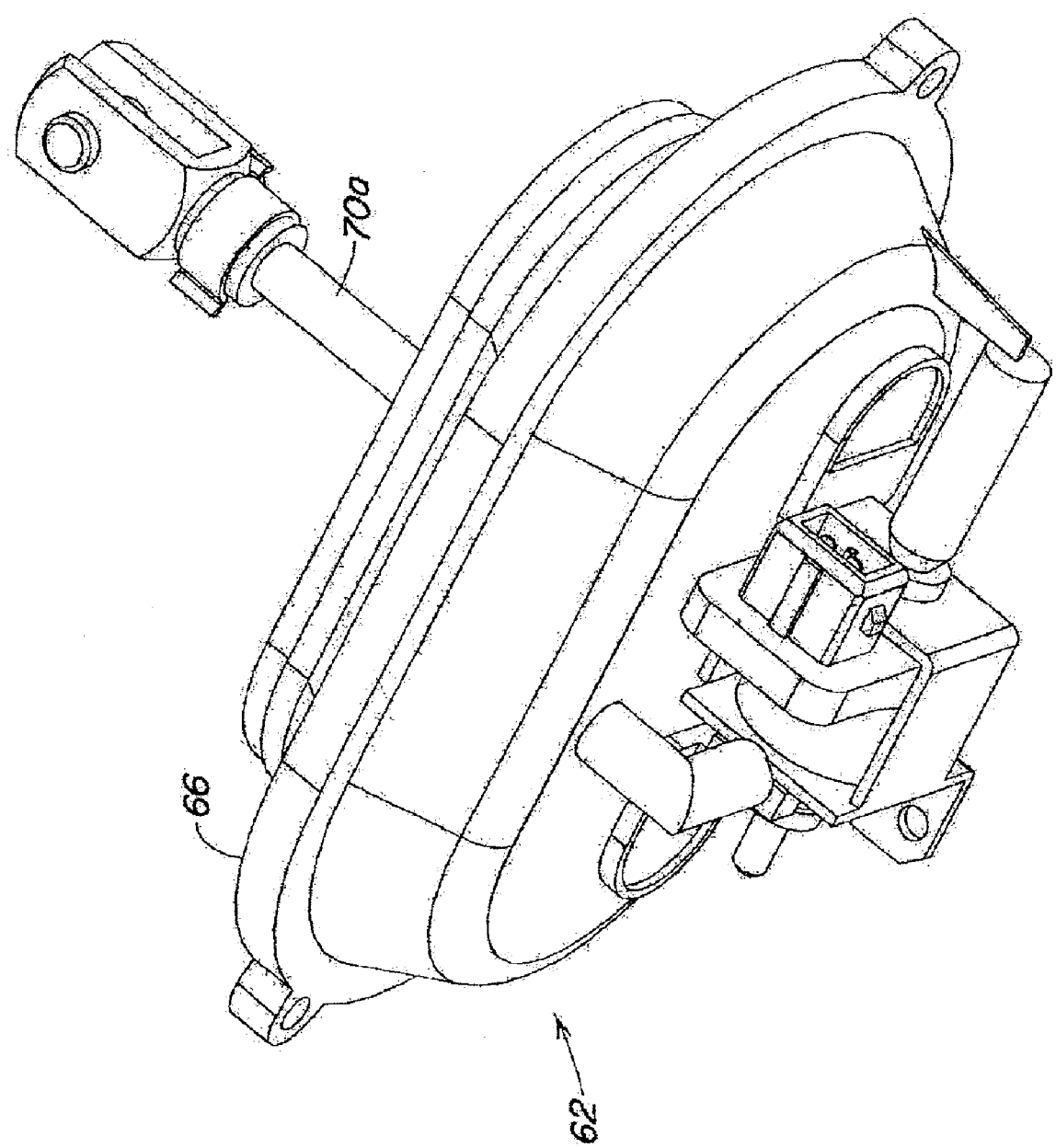
FIG. 7 is a top perspective view of a solenoid of the reverse logic steering mechanism illustrated in FIG. 6.
Figure 8:
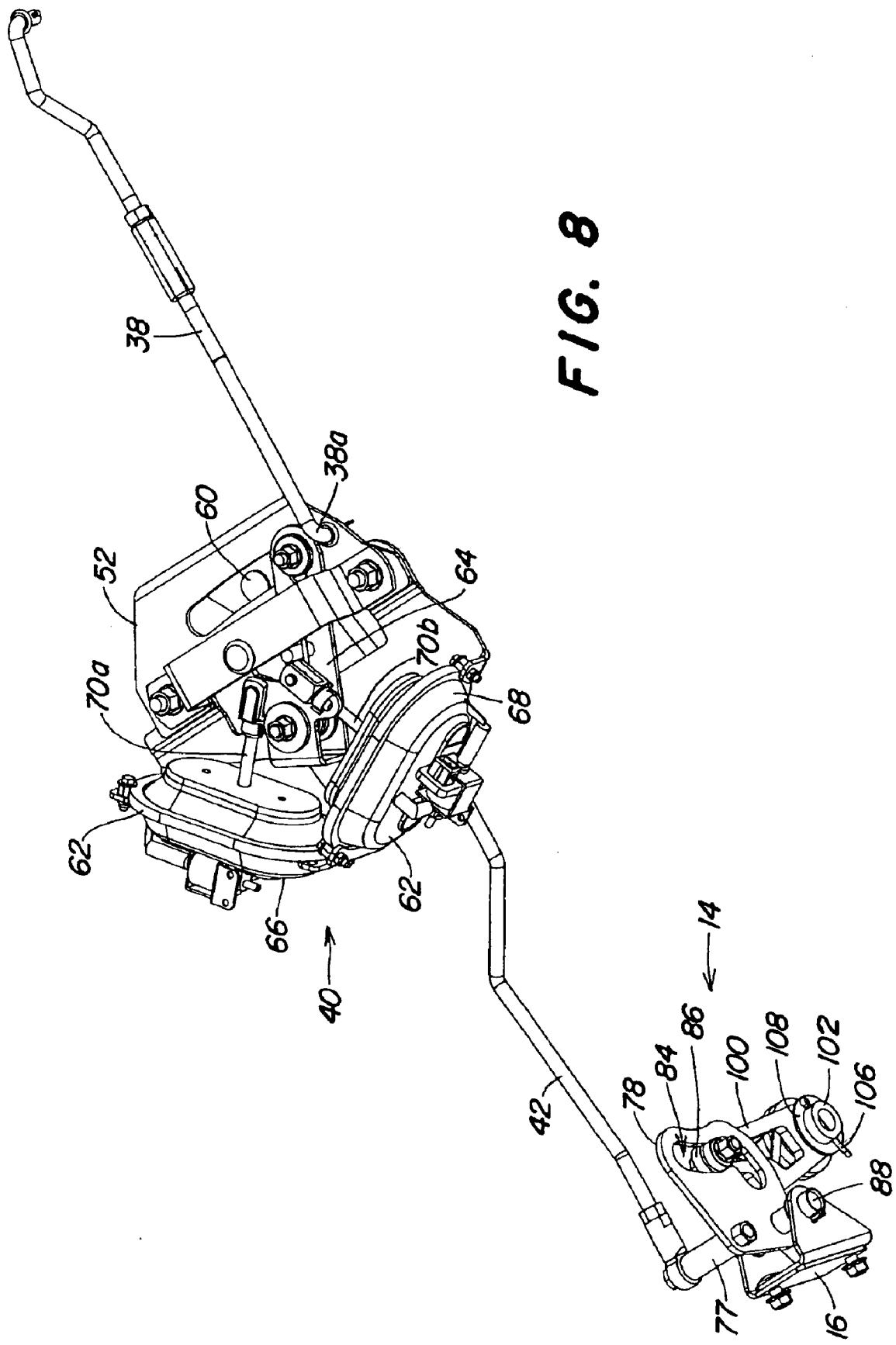
FIG. 8 is a top perspective view of the steering arms, reverse logic steering mechanism and the steering linkage device in one embodiment of the present invention.
Figure 9:
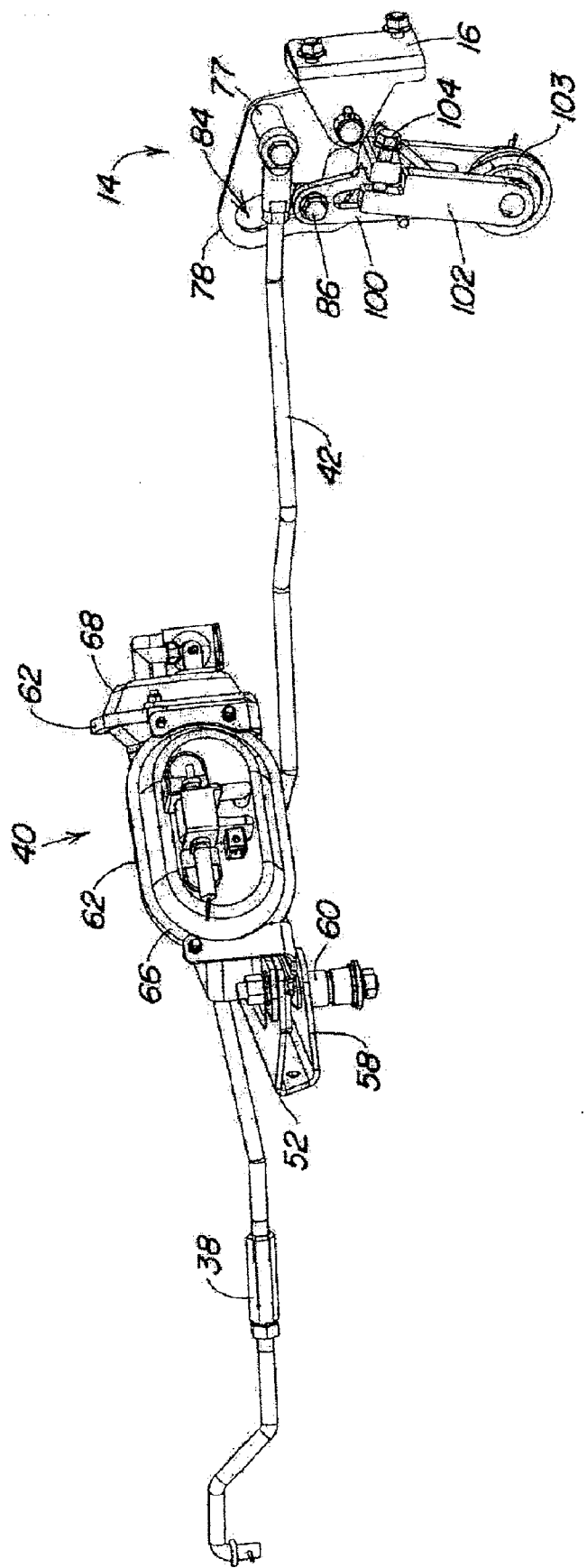
FIG. 9 is an elevated side perspective view of the steering arms, reverse logic steering mechanism and the steering linkage device in one embodiment of the present invention.

The reverse shifting solenoid 66 and the forward shifting solenoid 68 are initially installed in such a manner that when rod 70a is extended, rod 70b is retracted, or when rod 70b is extended, rod 70a is retracted. The reverse shifting solenoid 66 and forward shifting solenoid 68 are controlled by a suitable electrical switch (not shown). The switch preferably includes a mechanical plunger which has a retracted or extended position depending upon the position of the drive input control arm (not shown) of the drive transmission 25. When the tractor 10 is driving in a forward direction, the drive input arm pivots to a forward position, and when the tractor 10 is traveling in a reverse direction, the drive input control arm pivots to a reverse position. Accordingly, when the tractor 10 is moving forward, the switch sends a forward signal to the actuating mechanism 62. Upon receiving this forward signal, the reverse solenoid 66 extends the rod 70a, and the forward solenoid 68 retracts the rod 70b. As a result, the shifting member 64 moves the front end 42a of the rear steering arm 42 in relatively close proximity to the front steering arm 38, as illustrated in FIG. 6. In this position, when the front steering arm 38 moves forward, the rear steering arm 42 also moves forward, and when the front steering arm 38 moves backward, the rear steering arm 42 moves backward.

Therefore, when the tractor 10 is traveling forward, and the user turns the steering device 22 to the left, for example, the front steering arm 38 moves backward. This causes the steering transmission 27 to apply a backward rotational force to left drive wheel 18, decreasing its forward speed relative to the right drive wheel 18. The tractor 10 then turns to the left with respect to a relatively straight line of travel. The same logic would apply for a turn to the right.

When the user propels the tractor 10 in a reverse or backward direction, the electrical switch transmits a reverse signal to the actuating mechanism 62. This reverse signal causes the reverse shifting solenoid 66 to retract rod 70a while causing the forward shifting solenoid 68 to extend rod 70b. The front end 64b of the shifting member 64 then pivots to a position 56a in the slot 56 which is furthest from the rear end 38a of the front steering arm 38. In this position, the cam member 52 functions as a lever which converts the direction of motion of the front steering arm 38 to an opposite direction of motion of the rear steering arm 42. For example, when the user is propelling the tractor 10 in a reverse direction, and the user turns the steering device 22 to the left or in a counterclockwise direction, the front steering arm 38 moves backward but the rear steering arm 42 moves forward. Accordingly, the steering transmission 27 applies a forward rotational force to the left drive wheel 18, decreasing its backward speed relative to the right drive wheel. The tractor 10 then rearwardly pivots in a clockwise direction as would an automobile or other commonly used vehicle. Were it not for the reverse steering logic mechanism 40, when a user drives the tractor 10 in reverse, the tractor 10 would steer opposite the direction expected by a typical user of automobiles and conventional tractors.

It should be appreciated, that in other embodiments, the present invention does not have to include, or be coupled to, a reverse steering logic mechanism 40. Users of tractor 10 can develop the appropriate steering skill to operate tractor 10 without the steering logic provided by the rear steering logic mechanism 40. Furthermore, it should be appreciated that in other embodiments the steering linkage can include any suitable steering device, such as hand levers which have a fore and aft motion, as well as rotatable hand members of various configurations. The steering shaft, gear assembly and steering arms of the steering linkage can have any suitable geometric or linear configurations, including, but not limited to, the configurations shown in FIGS. 1 to 16.

Figure 10:
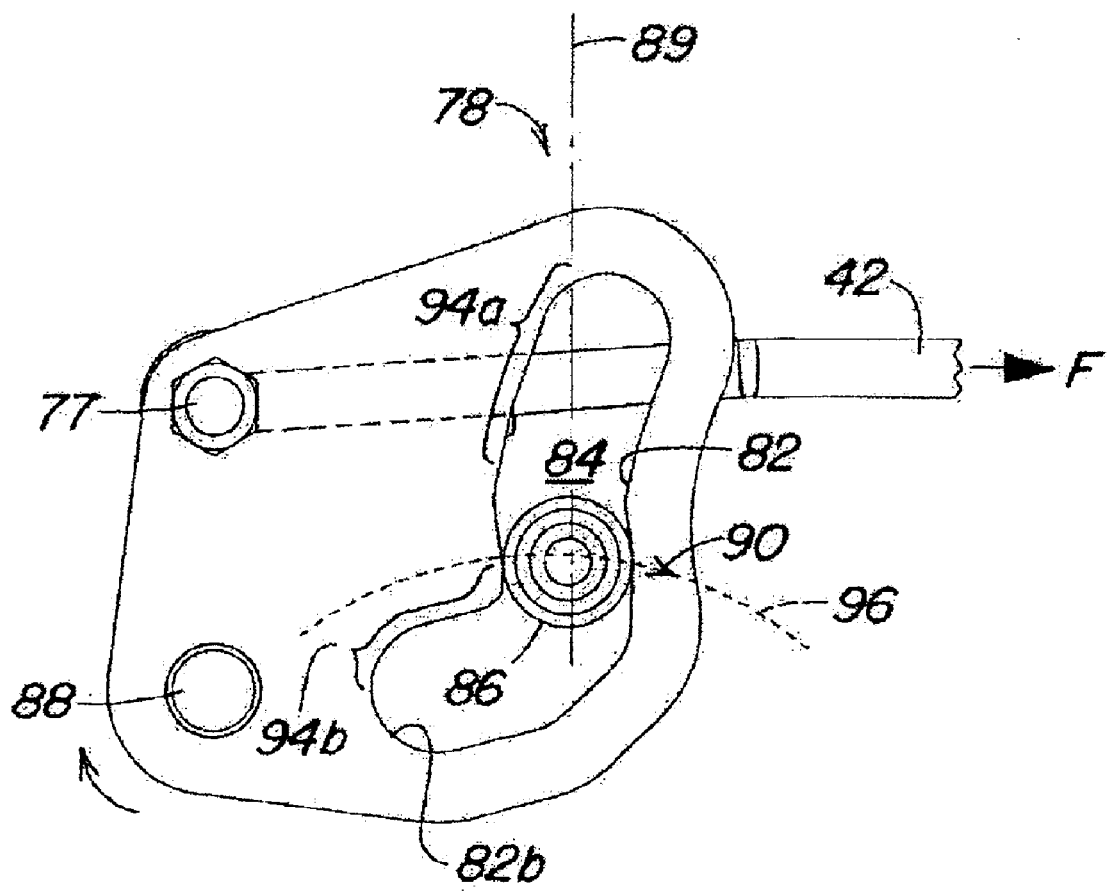
FIG. 10 is an elevated side view of the cam member of the steering linkage device coupled to a forward moving steering arm in one example of one embodiment of the present invention.
Figure 11:
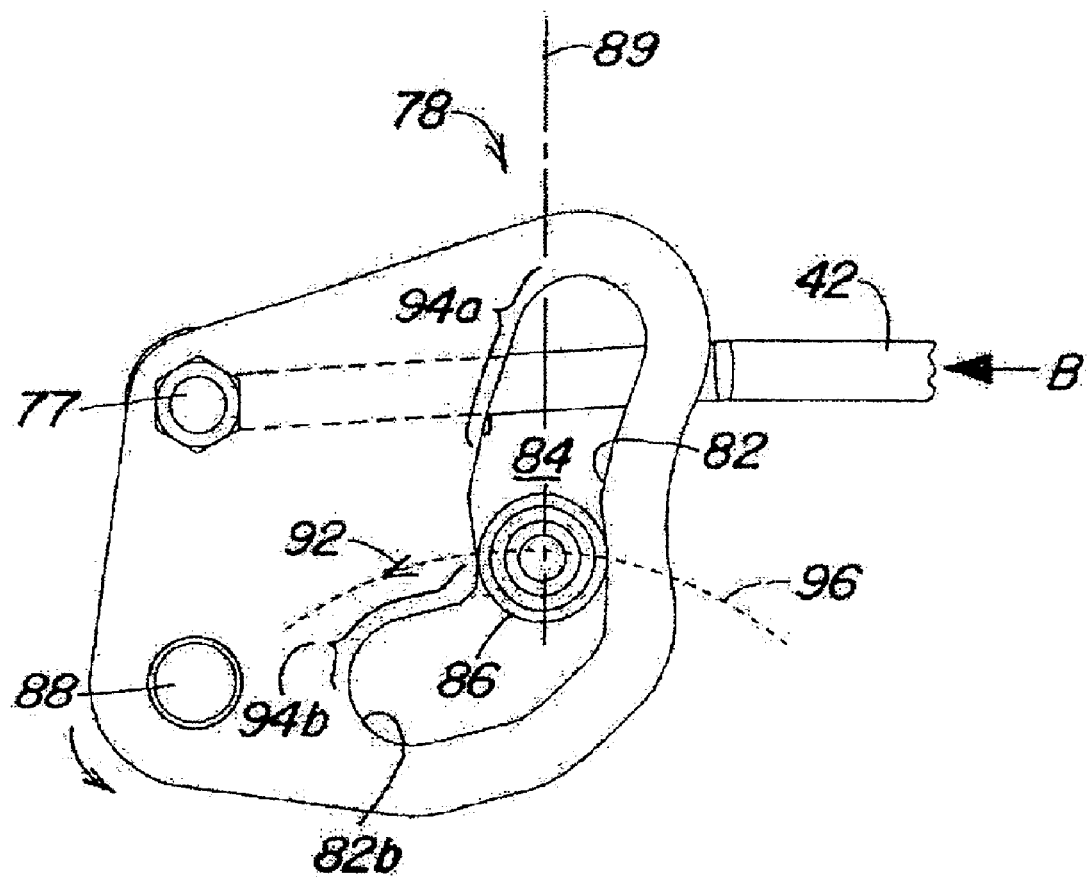
FIG. 11 is an elevated side view of the cam member of the steering linkage device coupled to a backward moving steering arm in one example of one embodiment of the present invention.
Figure 12:
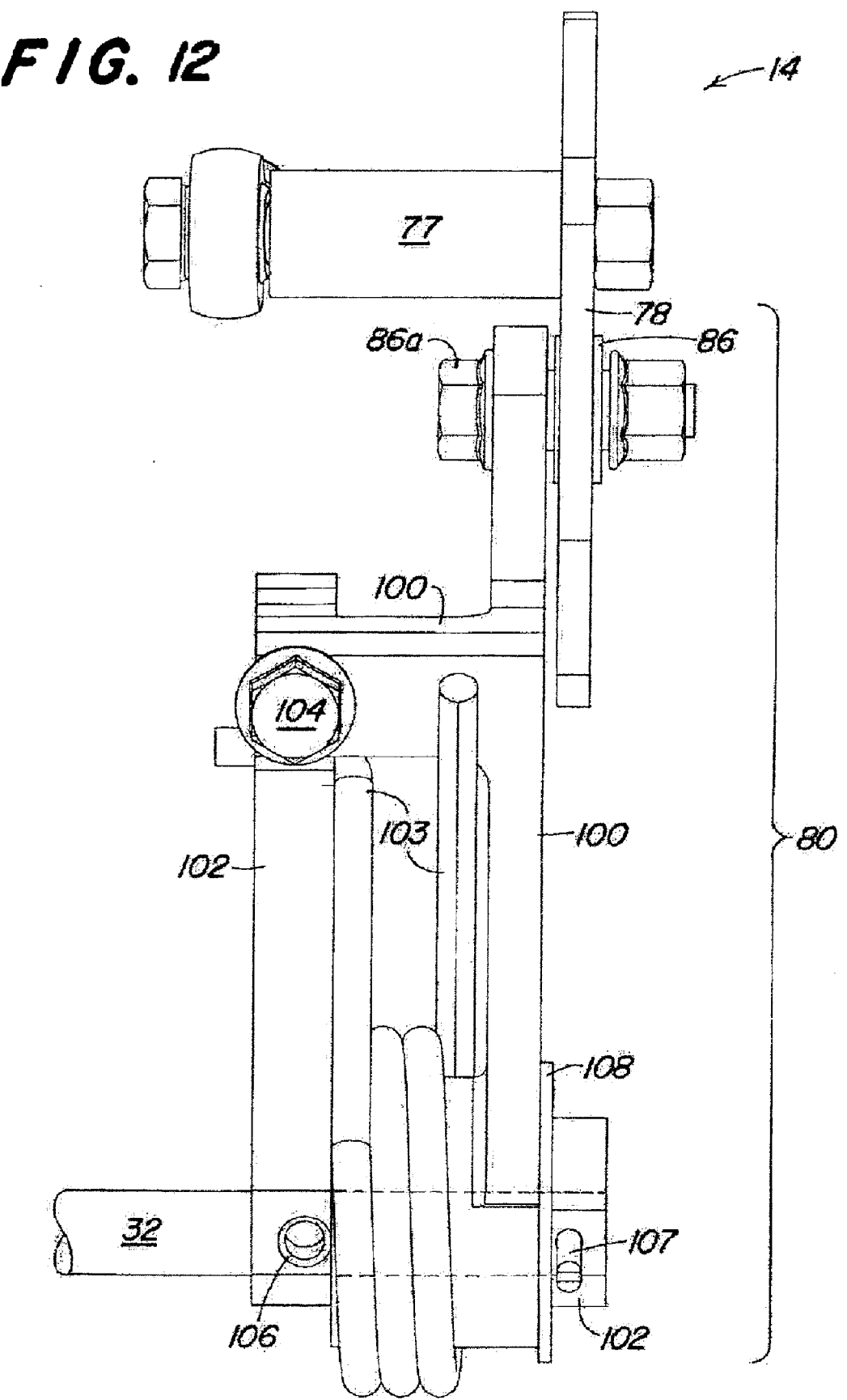
FIG. 12 is an elevated rear view of the steering linkage device coupled to a steering control shaft in one embodiment of the present invention.
Figure 14:
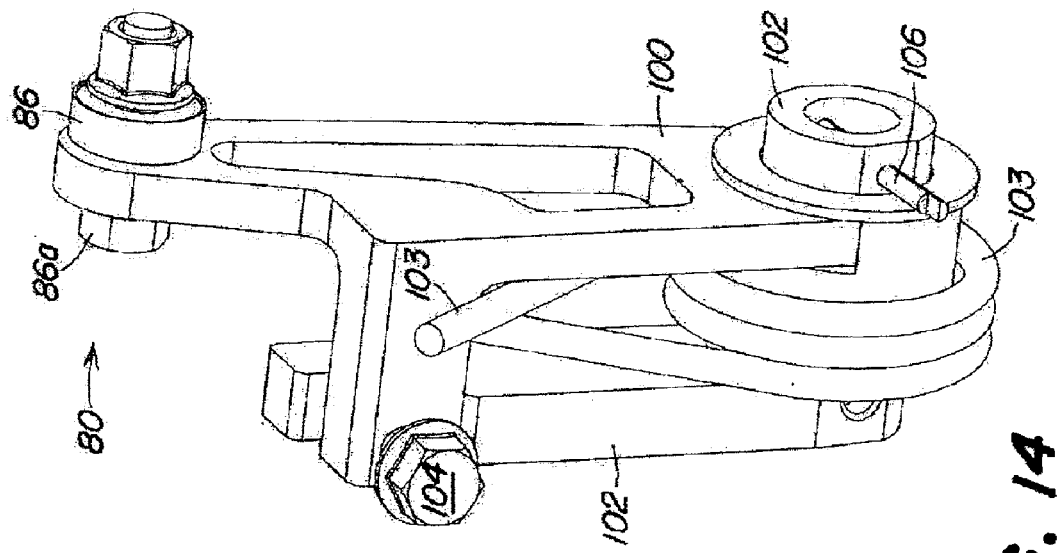
FIG. 14 is an elevated left side perspective view of the steering linkage device in one embodiment of the present invention.
Figure 13:
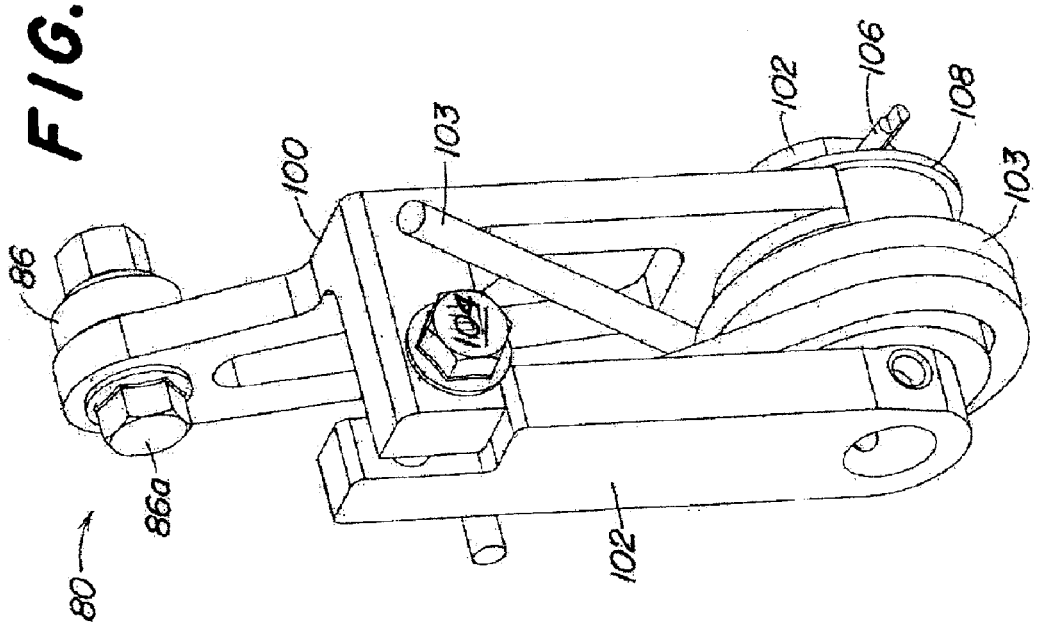
FIG. 13 is an elevated right side perspective view of the steering linkage device in one embodiment of the present invention.

In any case, the rear steering arm 42 is rotatably coupled to the steering linkage device 14 through suitable bolt, fastener or pivot shaft 77 which transmits the motion of the rear steering arm 42 to the steering control shaft 32 of the steering transmission 27. As best shown in FIGS. 12 through 16, the steering linkage device 14 includes one or more cam arms or cam members 78 which engage with and pivot one or more follower members 80. Follower member 80 is coupled to the steering control shaft 32. The cam member 78 includes an engaging member or surface 82 for the follower member 80. The engaging surface 82 is preferably a non-uniform cam slot wall which defines a cam slot 84. As illustrated in FIGS. 10 and 11, the follower engaging member 86, described below, slides within the slot 84 while engaging the engaging surface 82. The cam member 78 is rotatably connected to the tractor frame 16 by a suitable pivot shaft or fastener 88.

The follower engaging member 86 has a neutral position 89 which defines a relatively straight line of travel for the tractor 10. When the rear steering arm 42 is moved forward, the cam member 78 pivots about the axis defined by pivot shaft 88. The engaging surface 82 forces the follower engaging member 86 in the direction 90. As the rear steering arm 42 moves, the magnitude of which the engaging surface 82 displaces the follower engaging member 86 in direction 90 depends upon the particular configuration or profile of the engaging surface 82. Likewise, when the rear steering arm 42 is moved in a backward direction, as illustrated in FIG. 11, the cam member 78 rotates in a counterclockwise fashion about pivot shaft 88. The follower engaging member 86 then pivots in direction 92.

It is preferable that the engaging surface 84 has a plurality of curved portions 94a and 94b. Each curved portion 94a and 94b is associated with a particular degree of steering responsiveness for the user. For example, for relatively small input motions by the user, depending upon the direction, curved portion 94a or 94b causes the follower engaging member 86 to have a relatively small amount of movement along follower path 96. As the rear steering arm 42 is moved forward, for instance, the follower engaging member 86 moves in direction 90 within the curved portion 94a. Here, the follower engaging member 86 moves at a slower pivot rate than the pivot rate of the cam member 78. When the upper end 82a of the engaging surface 82 engages the follower engaging member 86, the upper end 82a pivots the follower engaging member 86 at a faster pivot rate. Similarly, as illustrated in FIG. 11, when the rear steering arm 42 is moved backward, the curved portion 94b pivots the follower engaging member 86 at a pivot rate which is lower than the pivot rate of the entire cam member 78. Once the lower end 82b of the engaging surface 82 engages the follower engaging member 86, the following engaging member 86 pivots at a faster rate.

Put another way, the cam profile of non-uniform engaging surface 82 converts the user's input motion, transmitted from the steering device 22 to the rear steering arm 42, into variable output motion. The steering ratio of the input motion to the output motion has a range. The particular steering ratio implemented within this range depends upon the magnitude of the input motion. The steering linkage device 14 automatically changes this steering ratio in response to different input motions by the user.

Accordingly, when the user makes relatively small or minor turns, the follower engaging member 86 slides back and forth within slot 84, avoiding the upper end 82a and the lower end 82b. However, when the user makes a relatively significant or large turn, the follower engaging member 86 slides and then engages with the lower end of 82b, at which point the cam member 78 will produce a relatively large output motion in the follower engaging member 86. Consequently, the cam member 78 receives the input motion from the user of a particular magnitude and then produces an output motion in such a manner that the ratio of the input motion to output motion varies depending upon the magnitude of the input motion. This ratio is preferably smaller for relatively small input motions and larger for relatively large input motions. The output motion of the follower engaging member 78 is transmitted to the steering control shaft 32 as described below.

As best illustrated in FIGS. 12 through 15, the follower member 80 includes: (a) a follower body or arm 100 connected to the follower engaging member 86 by a suitable bolt or fastener 86a; (b) a steering control shaft arm 102 secured to the steering control shaft 32 and received by the follower arm 100; and (c) a suitable biasing member 103, such as a torsion spring or other type of spring, which biases the follower arm 100 against the steering control shaft arm 102. Preferably, the follower member 80 also includes an adjustable spacing member 104, such as a set screw, which offsets the angular position of the follower arm 100 relative to the steering control shaft arm 102 about the axis defined by the steering control shaft 32. The follower member 80 also preferably includes: (a) a suitable fastener 106, such as the screw which secures the steering control shaft arm 102 to the steering control shaft 32; and (b) a pin or other suitable fastener 107, used in combination with a washer retaining member 108 to keep the follower arm 100 engaged with the steering control shaft arm 102 along the axis defined by the steering control shaft 32. The adjustable spacing member 104 enables the user to adjust the neutral or straight steering position for the tractor 10. For example, if the tractor 10 wanders to the right or to the left, the user can correct this by adjusting the adjustable spacing member 104.

Although the steering linkage device 14 includes a mechanical cam, it should be appreciated that the present invention can instead include a suitable electronic cam system which includes a suitable computer program for generating a cam profile for the same purposes of the cam member 78. It should be understood that the steering linkage device 14a of the present invention can include any suitable conversion device or motion transmitter 14b, including, but not limited to, a cam assembly 14c, which produces or otherwise provides a range of conversion factors, such as steering ratios FIG. 17.

It should also be appreciated that the steering linkage device 14 of the present invention can be operatively coupled to free-rotating conventional steering wheels which are not driven by the engine of a vehicle. For example, in a conventional tractor or vehicle, the steering device or steering wheel is operatively coupled to the front wheels which pivot to the right or to the left to control the direction of the vehicle. The rear wheels are typically the drive wheels which rotate at the same speed in a forward or backward motion. The steering linkage device of the present invention can be operatively coupled to a steering linkage of such a vehicle which is coupled to the free rotating steering wheels.

It should also be appreciated that the steering linkage device of the present invention can be installed and used on any tractor, mowing machine, snow plow machine, snow thrower, vacuum machine, cleaning machine, power tool or recreational vehicle which includes a steering assembly or steering linkage for controlling the direction of the vehicle.

The steering linkage device of the present invention, in one embodiment, provides the user of a vehicle, such as a tractor, with a steering responsiveness which varies with the degree to which the user turns the steering wheel. The steering linkage device includes a cam member having a cam profile which produces a range of steering input to output ratios. In one embodiment, a higher ratio is used for relatively large turns and a lower ratio is used for relatively small turns. Accordingly, the user has increased steering control.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. An apparatus for controlling steering of a vehicle having a frame and at least one drive wheel rotatably connected to the frame, the apparatus comprising:
   a rotatable steering device adapted to receive input motion of a magnitude;
   at least one arm having a first end and a second end, the first end operatively coupled to the rotatable steering device so as to move: (a) forward when the steering device is rotated in one direction; and (b) backward when the steering device is rotated in an opposite direction;
   at least one cam member having: (a) a first portion pivotally connectable to the arm; (b) a second portion pivotally connectable to the frame of the vehicle; and (c) a slot wall having a plurality of curved portions, each of the curved portions associated with a variable degree of steering responsiveness, the slot wall sized to receive a portion of a follower member, the cam member operable to cause the follower member to have an output motion of a magnitude, the magnitude of the input motion divided by the magnitude of the output motion defining a ratio which varies depending upon the magnitude of the input motion.

2. The apparatus of claim 1, wherein the slot wall has a plurality of ends, each of which is associated with a maximum pivot rate of the follower member.

3. The apparatus of claim 2, which includes a front arm having a first end coupled to the rotatable steering device and a second end coupled to the other arm.

4. The apparatus of claim 3, which includes another cam member, said other cam member having one portion coupled to the second end of the front arm, said other cam member having another portion coupled to the first end of the at least one arm.

5. The apparatus of claim 4, wherein the other cam member has a slot wall defining a slot, said slot having one end associated with a backward traveling motion of the vehicle, said slot having another end associated with a forward traveling motion of the vehicle.

6. The apparatus of claim 5, which includes a first arm connected to the follower member, a second arm connectable to a steering control shaft of the vehicle, and an adjustable spacing member that connects the said first arm to said second arm, the adjustable spacing member operable to enable a user to set a substantially straight steering setting for the vehicle.

7. The apparatus of claim 2, wherein the vehicle has a plurality of drive wheels operatively coupled to a steering control shaft, the steering control shaft being coupled to the follower member.

8. The apparatus of claim 1, wherein the follower member is movable within a slot defined by the slot wall, the follower member being movable between: (a) a neutral position associated with a substantially straight line of travel; and (b) a plurality of different positions on each side of the neutral position, the different positions associated with changes in a right turn or a left turn of the vehicle.

9. The apparatus of claim 7, which includes a securing member adapted to secure the follower member to the steering control shaft.

10. The apparatus of claim 1, wherein the vehicle is a tractor.

11. A device for use in conjunction with a steering linkage operatively coupled to a steering control shaft of a vehicle, the vehicle having at least one drive wheel operatively coupled to a drive transmission, the steering linkage having at least one steering arm movable to undergo a plurality of steering arm displacements, the device comprising:
a pivotable member operatively coupled to the steering arm, the pivotable member pivotable between a plurality of positions, the pivotable member having at least one non-uniform engaging surface defining a slot having a plurality of ends; and
a follower member operatively coupled to the steering control shaft of the vehicle, the follower member having an engagement member that is movable within the slot between: (i) a neutral position associated with a substantially straight line of travel; (ii) a plurality of positions on one side of the neutral position, said positions associated with a right turn of the vehicle; and (iii) a plurality of other positions on another side of the neutral position, said other positions associated with a left turn of the vehicle, follower member movable to produce a first output displacement caused by a first steering arm displacement and a second output displacement caused by a second steering arm displacement, wherein a ratio of the first steering arm displacement to the first output displacement is different than a ratio of the second steering arm displacement to the second output displacement.

12. The device of claim 11, wherein the pivotal member has a cam member.

13. The device of claim 12, wherein the cam member includes a lever.

14. The device of claim 13, wherein the non-uniform engaging surface includes a wall having a plurality of ends and a plurality of curved portions located between said ends, each of the curved portions associated with a range of steering responses.

15. The device of claim 14, wherein each of the ranges of the steering responses includes a maximum steering response associated with the position of the engagement member at one of the ends.

16. The device of claim 14, wherein the non-uniform engaging surface has a shape defined by a plurality of intersecting lines.

17. The device of claim 11, wherein the vehicle has a plurality of drive wheels operatively coupled to the drive transmission of the vehicle.

18. The device of claim 17, wherein the follower member includes a follower arm having one portion coupled to the engagement member, the follower arm having another portion coupled to the steering control shaft.

19. The device of claim 18, wherein the follower member has another arm, said other arm having one portion connected to the follower arm, said other arm having another portion secured to the steering control shaft.

20. The device of claim 11, which includes an adjustable spacing member which connects the follower arm to said other arm, said adjustable spacing member being adjustable to set a steering setting for the vehicle.

21. The device of claim 11, wherein the steering control shaft has a plurality of angular positions.

22. The device of claim 11, wherein the vehicle is a tractor.

23. A vehicle operable on a driving surface, the vehicle comprising:
a frame;
a plurality of drive wheels rotatably connected to the frame;
an engine supported by the frame;
a transmission operatively coupled to the engine, the transmission operatively coupled to the drive wheels; and
a steering device supported by the frame, the steering device adapted to receive input motion of a magnitude;
at least one cam member having one portion operatively coupled to the steering device and another portion pivotably coupled to the frame, the cam member having a non-uniform slot wall defining a non-uniform slot; and
a follower member movably engaged with the non-uniform slot wall of the cam member, the follower member movable along the non-uniform slot wall between a plurality of positions including: (a) a neutral position associated with a substantially straight line of travel; (b) a plurality of positions on one side of the neutral position, said positions associated with varying degrees of steering responsiveness for a right turn; and (b) a plurality of other positions on another side of the neutral position, said positions associated with varying degrees of steering responsiveness for a left turn, each of the movements of the follower member producing an output motion of a magnitude, the magnitude of the input motion divided by the magnitude of the output motion defining a ratio which varies depending upon the magnitude of the input motion; and
a steering control shaft having: (a) one end coupled to the follower member; and (b) another end operatively coupled to the drive wheels.

24. The vehicle of claim 23, which includes a reverse logic mechanism supported by the frame.

25. The vehicle of claim 24, which includes a front arm having a plurality of ends and a rear arm having a plurality of ends, the first end of the front arm coupled to the steering device, the second end of the front arm coupled to one portion of the reverse logic mechanism, the first end of the rear arm coupled to another portion of the reverse logic mechanism, the second end of the rear arm coupled to said at least one cam member.

26. The vehicle of claim 23, wherein the reverse logic mechanism has a cam member other than said at least one cam member.

27. The vehicle of claim 23, wherein the vehicle is a tractor.

28. A steering linkage for a vehicle, comprising:

a rotatable hand steering device;

a gear set operatively coupled to the rotatable hand steering device;

at least one arm operatively coupled to the gear set;

a cam member operatively coupled to one end of the arm, the cam member having a non-uniform slot wall;

a follower member movably engaged with the non-uniform slot wall of the cam member, the follower member movable along the non-uniform slot wall between a plurality of positions including: (a) a neutral position associated with a substantially straight line of travel; (b) a plurality of positions on one side of the neutral position, said positions associated with varying degrees of steering responsiveness for a right turn; and (b) a plurality of other positions on another side of the neutral position, said positions associated with varying degrees of steering responsiveness for a left turn; and a steering control shaft secured to the follower member.

29. The steering linkage of claim 28, which includes a plurality of arms operatively coupled to the gear set.

30. The steering linkage of claim 29, which includes a reverse logic mechanism operatively coupled to the arms.

31. The steering linkage of claim 28, wherein the follower member includes an adjustable member operable to set a steering setting for the vehicle.

32. A method for changing a direction of travel of a tractor, said method comprising the steps of:

(a) enabling a user to input a plurality of rotary user motions of different magnitudes by moving a steering device of the tractor;

(b) converting the rotary user motions to forward and backward motions;

(c) transmitting the forward and backward motions to a first conversion device, whereby, when the tractor is being driven in reverse, the first conversion device converts the motions of the forward and backward motions to opposite motions;

(d) transmitting the forward motions, the backward motions and the opposite motions to a second conversion device;

(e) causing the second conversion device to provide a range of conversion factors for converting the forward motions, the backward motions and the opposite motions;

(f) automatically using certain conversion factors within the range to produce output motions, the conversion factors used based on the magnitudes of the rotary user motions; and (g) changing the direction of the vehicle based on the output motions.

33. The method of claim 32, wherein step (c) includes the step of transmitting the rotary user motions to a first cam member.

34. The method of claim 33, wherein step (d) includes the step of transmitting the rotary user motions to a second cam member.

* * * * *